United States Patent
Cotton et al.

(10) Patent No.: US 7,758,310 B2
(45) Date of Patent: Jul. 20, 2010

(54) TRANSLATIONAL THRUST SYSTEM FOR A ROTARY WING AIRCRAFT

(75) Inventors: Bryan S. Cotton, Millport, NY (US); Kenneth C. Arifian, Oxford, CT (US); Leslie Schweizer, Cayuta, NY (US); Jeffrey L. Cevette, Elkland, PA (US)

(73) Assignee: Sikorsky Aircraft Corporation, Stratford, CT (US)

( * ) Notice: Subject to any disclaimer, the term of this patent is extended or adjusted under 35 U.S.C. 154(b) by 665 days.

(21) Appl. No.: 11/623,105

(22) Filed: Jan. 15, 2007

(65) Prior Publication Data

US 2008/0169379 A1    Jul. 17, 2008

(51) Int. Cl.
B63H 3/04    (2006.01)
B64D 35/06   (2006.01)

(52) U.S. Cl. .................................. 416/157 R; 416/158

(58) Field of Classification Search ................. 416/146, 416/157 R, 157 A, 158
See application file for complete search history.

(56) References Cited

U.S. PATENT DOCUMENTS

| | | | |
|---|---|---|---|
| 3,261,406 A * | 7/1966 | Goodman et al. | 416/35 |
| 3,263,754 A * | 8/1966 | Belliere | 416/157 R |
| 4,523,891 A * | 6/1985 | Schwartz et al. | 416/157 R |
| 4,648,798 A * | 3/1987 | Voisard | 416/48 |
| 4,783,023 A * | 11/1988 | Jupe | 244/6 |
| 4,953,811 A | 9/1990 | Smith | |
| 5,131,603 A | 7/1992 | Meyers | |
| 5,174,523 A | 12/1992 | Balmford | |
| 5,174,718 A | 12/1992 | Lampeter | |
| 5,186,608 A | 2/1993 | Bagge | |
| 6,259,975 B1 | 7/2001 | Rollet | |
| 6,883,750 B2 * | 4/2005 | Gmirya | 244/54 |
| 2006/0269413 A1 | 11/2006 | Cotton | |

FOREIGN PATENT DOCUMENTS

| | | |
|---|---|---|
| GB | 854530 | 11/1960 |
| WO | 9717252 | 5/1997 |

OTHER PUBLICATIONS

PCT International Search Report and Written Opinion, mailed Feb. 4, 2009, International application No. PCT/US2007/084397.

* cited by examiner

*Primary Examiner*—Edward Look
*Assistant Examiner*—Jesse Prager
(74) *Attorney, Agent, or Firm*—Carlson, Gaskey & Olds PC (57) ABSTRACT

A translational thrust system for a high speed rotary-wing aircraft includes a propeller system driven by a propeller gearbox, a hydraulic system, and a mechanical-hydraulic control system. The mechanical-hydraulic control system utilizes a hydraulic fluid which travels to and from a propeller dome via an oil transfer/position feedback tube which translates with a propeller pitch change piston. Translation of the oil transfer/position feedback tube and the propeller pitch change piston pitches the blades between high (coarse) and low (fine) pitch positions.

20 Claims, 11 Drawing Sheets

TRANSLATIONAL THRUST SYSTEM FOR A ROTARY WING AIRCRAFT

BACKGROUND OF THE INVENTION

The present invention relates to a propeller system, and more particularly to a translational thrust system with a propeller pitch change system which integrates thrust control with a Fly-By-Wire (FBW) system of a high-speed rotary-wing aircraft.

A rotary wing aircraft with a coaxial contra-rotating rotor system is capable of higher speeds compared to conventional single rotor helicopters due in part to the balance of lift between the advancing sides of the main rotor blades on the upper and lower rotor systems. To still further increase airspeed, supplemental translational thrust is provided by a translational thrust system such as a propeller system oriented substantially horizontal and parallel to the aircraft longitudinal axis to provide thrust for high-speed flight.

Variable pitch propellers are common in fixed wing aircraft. These propellers are generally attached directly to the crankshaft of a reciprocating engine, or are mated to a gearbox of a turbine engine. In either case, the speed of the propeller is proportional to the speed of the engine. The propeller is also the only significant load the engine has to drive.

Variable pitch propellers common to fixed wing aircraft are unsuitable for the translational thrust system of a high speed rotary-wing aircraft as a propeller governor controls engine RPM by pitch change of the propeller blades. On a high speed rotary-wing aircraft with a translational thrust system, the pitch of the propeller blades are controlled independent of engine RPM to control translational thrust as the aircraft operates through a range of RPMs based upon flight regime. With the propeller held at a constant pitch, as this invention does for a given trim condition, the torque required at the propeller remains largely constant compared to the main rotor. Conventional variable pitch propeller systems are unsuitable for such independent operation.

Conventional variable pitch propeller systems efficiently convert rotary motion into propulsive thrust, however, conventional variable pitch propeller systems utilize a conventional propeller governor which results in at least two problems for a high-speed rotary-wing aircraft. First, on a conventional fixed wing airplane, the governor is used to control engine RPM by changing pitch of the propeller blades. On high-speed rotary-wing aircraft with a translational thrust system, the requirement is to control thrust by changing the pitch of the blades, with RPM maintained constant by the Electronic Control Unit (ECU) on the engine. The second problem is potential interplay between the ECU and the propeller governor. Consider a disturbance where the RPM of the system is lowered by several percent. The ECU will detect the reduction in RPM and add more fuel as a result. Additionally, the reduction in RPM will cause the flyweights in the propeller governor to swing inward, moving its pilot valve to dump oil out of the hub, and reduce prop pitch. This will reduce the mechanical load of the overall system. With both controllers acting to increase the speed of the system, the response may be greater than either had anticipated, and an overshoot will result. The reaction to an overspeed condition will be similar, where the ECU will reduce the amount of fuel while the governor simultaneously reduces the pitch of the propeller. With two separate controllers trying to maintain RPM, there is the potential for development of a torsional instability.

Accordingly, it is desirable to provide a propeller pitch change system for a translational thrust system of a high-speed rotary-wing aircraft which independently integrates thrust control with a Fly-By-Wire (FBW) system to position the propeller blades with a high degree of pitch angle confidence.

SUMMARY OF THE INVENTION

A drive system for a high speed rotary-wing aircraft according to the present invention include a dual, contra-rotating, rotor system and a translational thrust system to provide translational thrust generally parallel to an aircraft longitudinal axis.

The translational thrust system generally includes a propeller system driven by a propeller gearbox, a hydraulic system, and a mechanical-hydraulic control system. The mechanical-hydraulic control system is operated in response to a propeller pitch controller in communication with a Fly-By-Wire (FBW) flight control system and an engine electronic control unit (ECU) to adjust the pitch of the propeller system for a multiple of flight regimes.

The propeller system generally includes a hub assembly which supports a plurality of propeller blades which extend therefrom. The propeller blades are pitched through a respective pitch change linkage in response to translation of a propeller pitch change piston which is connected thereto. Hydraulic fluid such as a lubricating oil travels to and from the propeller dome via the oil transfer/position feedback tube. The relatively large propeller pitch change piston area allows large forces to be reacted with moderate pressures which only need oppose a unidirectional load as hydraulic fluid volume in the propeller hub is either held constant, increased under force, or allowed to bleed out to control propeller blade pitch.

The hydraulic system includes a high pressure source such as gearbox driven pump that provides hydraulic pressure to actuate the translational thrust system. The high pressure source provides hydraulic pressure to a shuttle valve system to selectively effectuate pitch change in each of the blades by translation of the oil transfer/position feedback tube and propeller pitch change piston. Translation of the propeller pitch change piston pitches the blades between high (coarse) and low (fine) pitch positions with the lowest pitch being a fail-safe flat pitch position.

Another embodiment of the mechanical-hydraulic control system permits the oil transfer/position feedback tube to rotate as well as translate with the propeller pitch change piston. The shuttle valve system in this embodiment may then be remote from the oil transfer/position feedback tube.

The present invention therefore provides a propeller pitch change system for a translational thrust system of a high-speed rotary-wing aircraft which independently integrates thrust control with a Fly-By-Wire (FBW) system to position the propeller blades with a high degree of pitch angle confidence.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
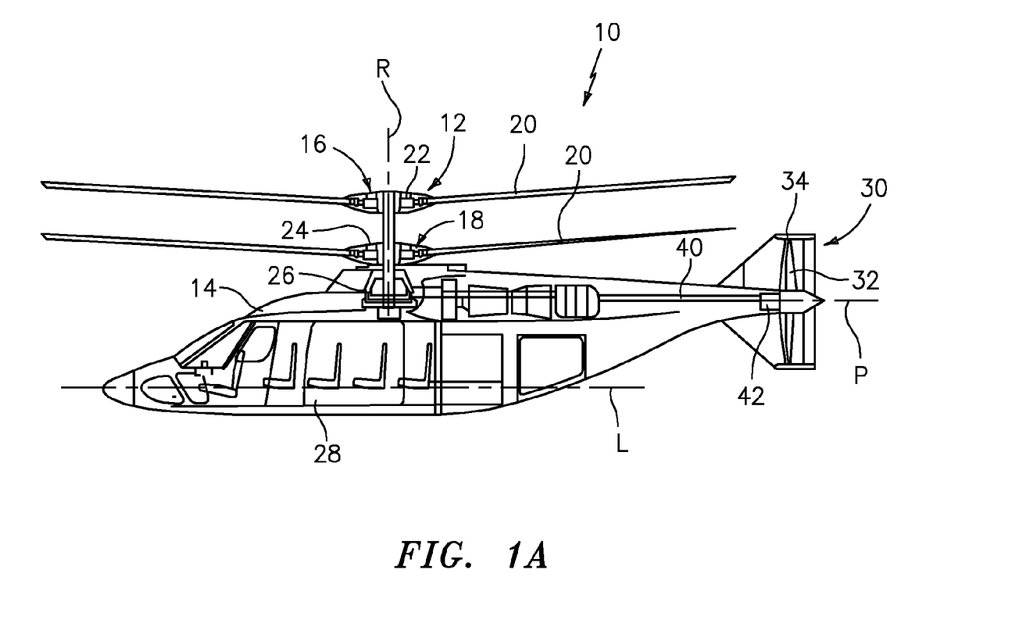
FIGS. 1A-1B are general views of an exemplary rotary wing aircraft embodiment for use with the present invention.
Figure 1B:
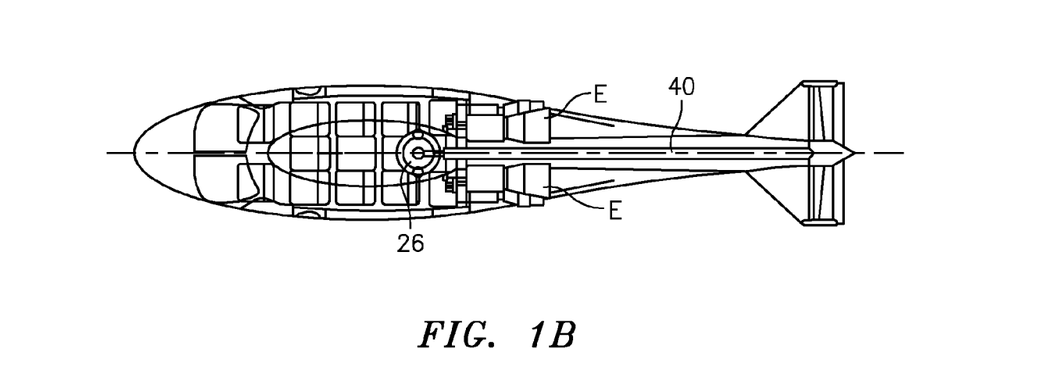

FIGS. 1A-1B illustrates a vertical takeoff and landing (VTOL) high speed compound or coaxial contra-rotating rigid rotor aircraft 10 having a dual, contra-rotating, coaxial main rotor system 12, which rotates about a rotor axis of rotation A. The aircraft 10 includes an airframe 14 which supports the dual, contra-rotating, coaxial main rotor system 12 as well as a translational thrust system 30 which provides translational thrust generally parallel to an aircraft longitudinal axis L. It should be understood that other aircraft configurations will benefit from the present invention.

The main rotor system 12 includes a first rotor system 16 and a second rotor system 18 each rotor system 16, 18 includes a multiple of rotor blades 20 mounted to a rotor hub 22, 24. The main rotor system 12 is driven by a main gearbox 26. The translational thrust system 30 may be any propeller system including, but not limited to a pusher propeller, a tractor propeller, a nacelle mounted propeller, etc. Preferably, the translational thrust system 30 includes a pusher propeller system 32 as illustrated with a propeller rotational axis P oriented substantially horizontal and parallel to the aircraft longitudinal axis L to provide thrust for high-speed flight. The translational thrust system 30 may alternatively or additionally include side mounted thrusters, forward mounted thrusters or other prop or jet powered systems separate from the main rotor system 12. The illustrated embodiment mounts the propeller system 32 within an aerodynamic cowling 34 at the rear of the airframe 14. The translational thrust system 30 is preferably driven through the main gearbox 26 which drives the rotor system 12.

The main gearbox 26 is driven by one or more engines E (two shown). In the case of a rotary wing aircraft, the gearbox 26 is preferably interposed between one or more gas turbine engines (illustrated schematically at E), the rotor system 12 and the translational thrust system 30. The main gearbox 26 is preferably a split torque gearbox which carries torque from the engines E through a multitude of drive train paths.

Figure 2:
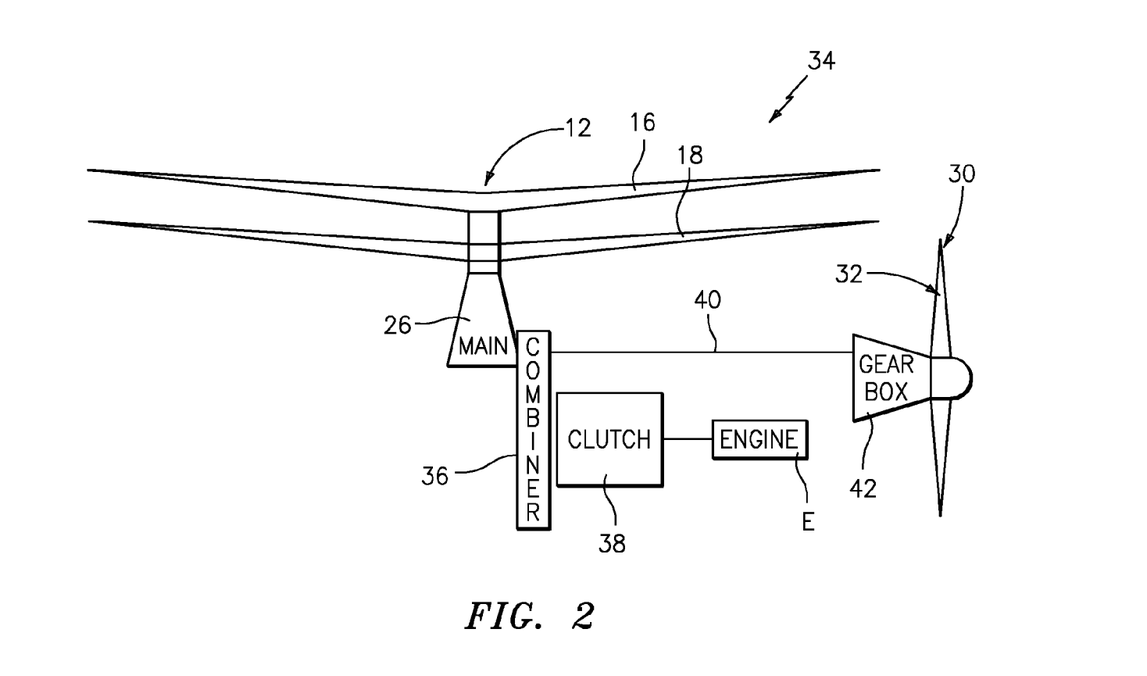
FIG. 2 is a block diagram of a drive system of a rotary-wing aircraft with a coaxial counter rotating rotor system with a translational thrust system of the present invention.

Referring to FIG. 2, the drive system 34 of the aircraft 10 is schematically illustrated. The main gearbox 26 is mechanically connected to the main rotor system 12 and to the translational thrust system 30 so that the main rotor system 12 and the translational thrust system 30 are both driven by the main gearbox 26. The drive system 34 may include a combiner gearbox 36 in meshing engagement with the main gearbox 26. As shown, the combiner gearbox 36 may be driven by one or more engines E. The engines E drive the combiner gearbox 36 and thus the main gearbox 26 through a disconnecting mechanism, preferably, an overrunning clutch 38. The translational thrust system 30 preferably includes a drive shaft 40 which is driven by the combiner gearbox 36 to drive the propeller system 32 through a propeller gearbox 42. It should be understood that although the combiner gearbox 36 is schematically illustrated as a separate component, the combiner gearbox 36 may alternatively be incorporated directly into the main gearbox 26.

The overrunning clutch 38 is preferably located between the one or more engines E and combiner gearbox 36. This arrangement is possible because the translational thrust system 30 requires significantly more power during high speed flight than the main rotor system 12. This is significant since, during an engine failure, the translational thrust system 30 is set to a flat pitch otherwise the load imposed on the drive system 34 may slow the main rotor system 12 and complicate autorotative landing.

Figure 3:
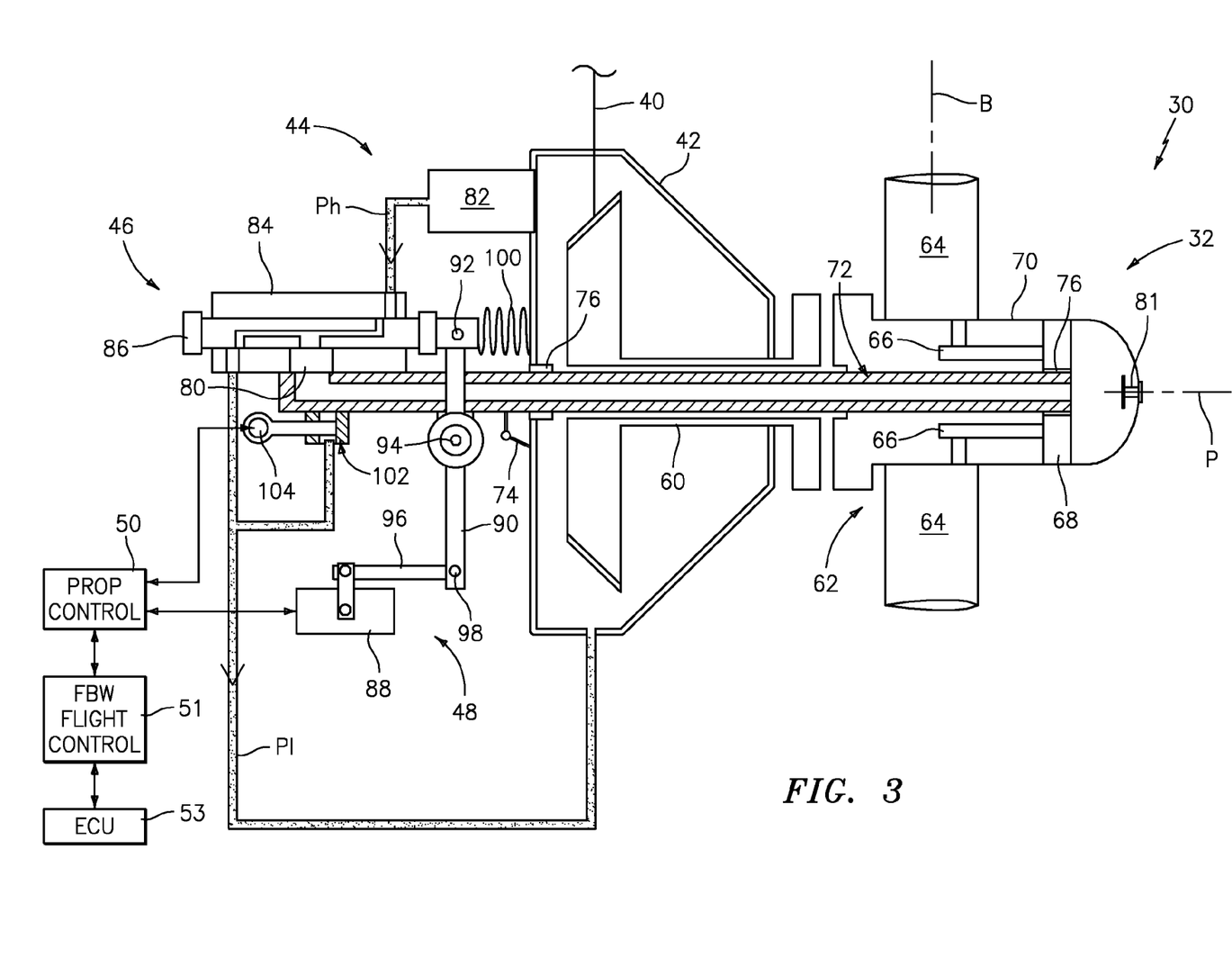
FIG. 3 is a schematic view of a translational thrust system with a mechanical-hydraulic control system for pitch control of a propeller system, the mechanical-hydraulic control system illustrated in a steady pitch case state.

Referring to FIG. 3, the translational thrust system 30 generally includes the propeller system 32 driven by the propeller gearbox 42, a hydraulic system 44, and a mechanical-hydraulic control system 48. The mechanical-hydraulic control system 48 is preferably operated in response to a propeller pitch controller 50 in communication with a Fly-By-Wire (FBW) flight control system 51 and an engine controller 53. The propeller pitch controller 50 operates to adjust the pitch of the propeller system 32 in a multiple of flight regimes. Within a particular flight regime, RPM of the rotor and propeller system are maintained by an ECU. In high speed flight, the aircraft may be trimmed such that the rotor is inclined forward, or exactly perpendicular to the relative wind, or rearward. Each of these trim states will change the behavior of the main rotor, and the torque required to maintain a constant RPM. Additionally, maneuvers and gusts may cause the aircraft to transition between each of these states.

The propeller gearbox 42 drives a propeller shaft 60 which rotates the propeller system 32. The propeller system 32 generally includes a hub assembly 62 which supports a plurality of propeller blades 64 which extend therefrom. The propeller rotational axis P is substantially perpendicular to a plane B which is defined by the blades 64. The propeller blades 64 are pitched through a respective pitch change linkage 66 in response to axial movement of a propeller pitch change piston 68 which is connected thereto. Spring forces and aerodynamic forces bias the propeller blades 64 toward flat pitch which corresponds to a minimum oil volume propeller pitch change piston 68 position (all the way to the right in the Figures; see FIG. 4).

The propeller pitch change piston 68 is mounted within a propeller dome 70 for translation therein. The propeller pitch change piston 68 preferably rotates with the propeller dome 70 relative to a rotationally fixed but axially movable oil transfer/position feedback tube 72. Hydraulic fluid such as a lubricating oil travels to and from the propeller dome 70 via the oil transfer/position feedback tube 72. The oil transfer/position feedback tube 72 need not rotate. Preferably, a scissors assembly 74 or the like mounted to the propeller gearbox 42 prevents the oil transfer/position feedback tube 72 from rotating.

A rotational interface 76 between the propeller pitch change piston 68 and the oil transfer/position feedback tube 72 preferably includes a bearing and a high pressure seal which accommodates rotational motion between the propeller pitch change piston 68 and the oil transfer/position feedback tube 72, but prevents relative translation. That is, the oil transfer/position feedback tube 72 axially translates along axis P with the propeller pitch change piston 68 which rotates relative thereto. An interface 78 between the propeller gearbox 42 and the oil transfer/position feedback tube 72 is preferably a low pressure, non-rotating, sliding seal.

Outside of the propeller gearbox 42, the shuttle valve system 46 hydraulically communicates with the oil transfer/position feedback tube 72. For the steady pitch case, the shuttle valve system 46 effectively blocks hydraulic communication with a port 80 in the oil transfer/position feedback tube 72 such that the volume of oil is maintained constant in the propeller dome 70.

Figure 4:
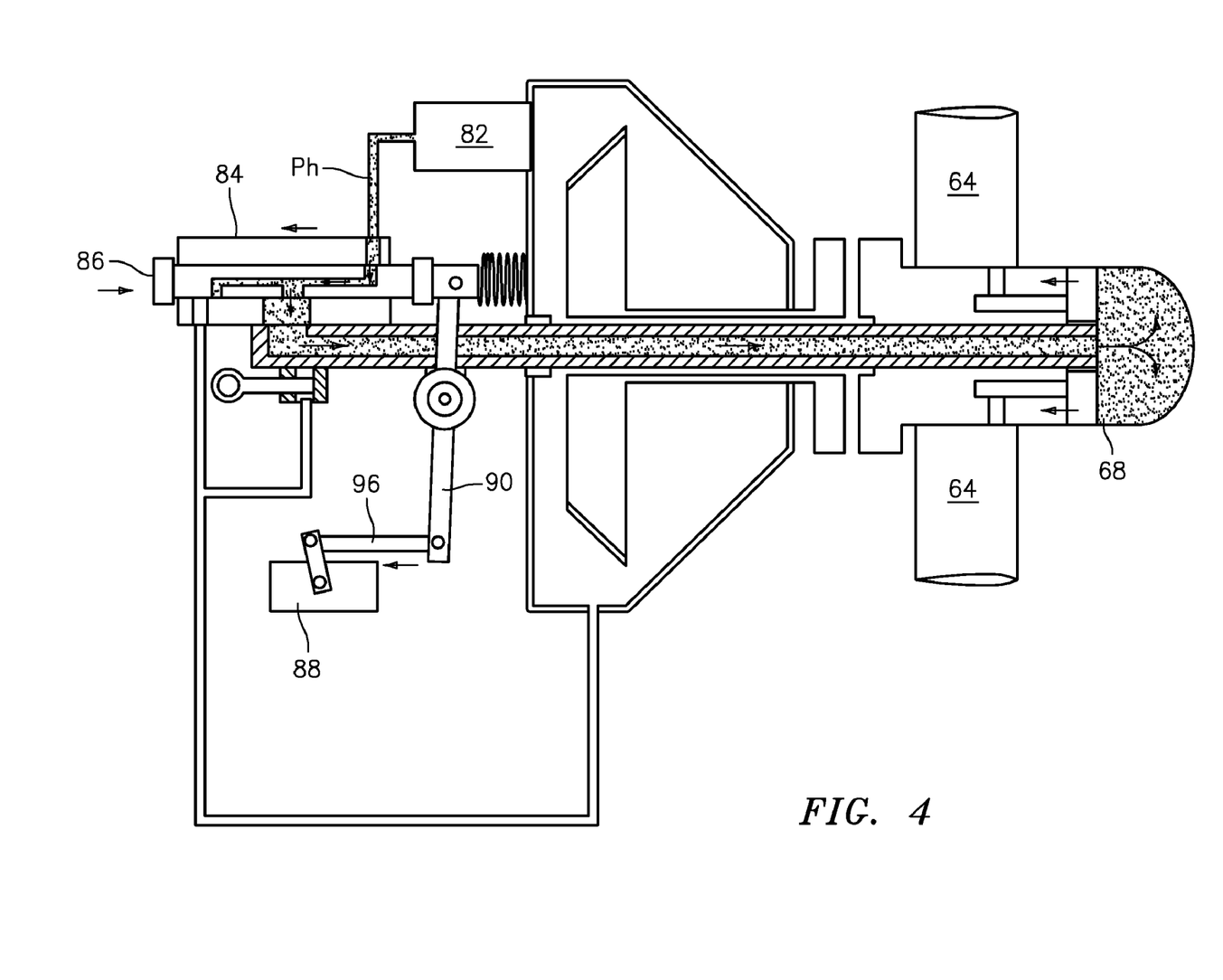
FIG. 4 is a schematic view of the mechanical-hydraulic control system for pitch control of a propeller system of FIG. 3, the mechanical-hydraulic control system illustrated in an increasing pitch case state.
Figure 5:
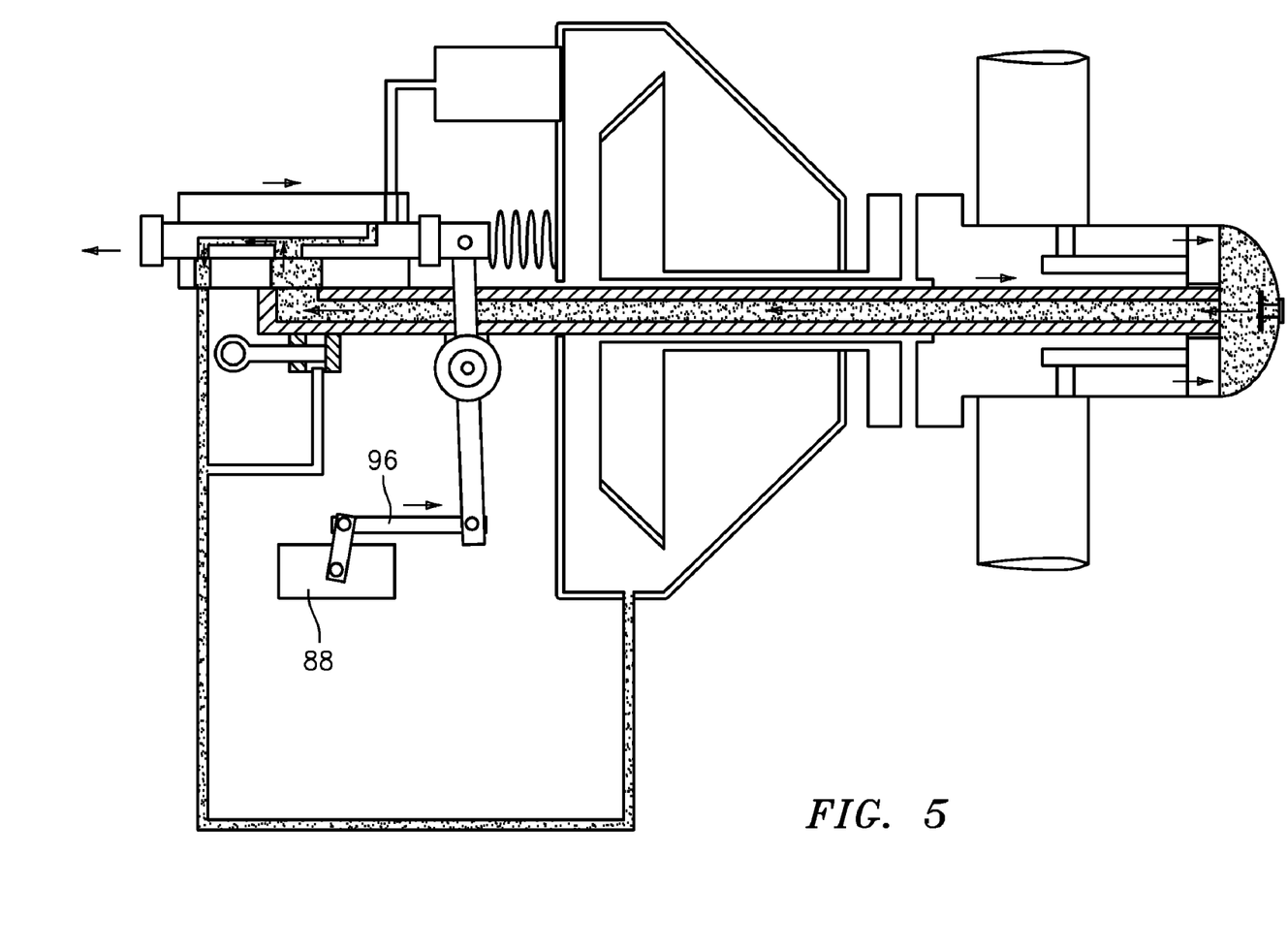
FIG. 5 is a schematic view of the mechanical-hydraulic control system for pitch control of a propeller system of FIG. 3, the mechanical-hydraulic control system illustrated in an decreasing pitch case state.

The hydraulic system 44 includes a high pressure source 82 such as gearbox driven pump that provides hydraulic pressure to actuate the translational thrust system 30. It should be understood that various actuation systems may be utilized with the present invention. The high pressure source 82 provides hydraulic pressure to the shuttle valve system 46 to selectively effectuate a pitch change in each of the blades 64 by movement of the oil transfer/position feedback tube 72 and propeller pitch change piston 68. Translation of the propeller pitch change piston 68 pitches the blades 64 between high (coarse; FIG. 4) and low (fine; FIG. 5) pitch positions with the lowest pitch preferably being a fail-safe flat pitch position.

Preferably, a pitch stop 81 is located within the propeller dome 70. The pitch stop 81 is preferably adjustable. When oil pressure is lost, the pitch stop 81 operates as a hard mechanical stop at flat pitch such that the propeller pitch change piston 68 will rest on the pitch stop 81, preferably both the pitch stop 81 and the propeller pitch change piston 68 rotate. Alternatively, it should be understood that future tactical aircraft may have reverse thrust capability, so the pitch stop 81 preferably includes a selective negative pitch angle capability. That is, the pitch stop 81 may be selectively disengaged when reverse thrust is required yet still provide the fail-safe flat pitch position unless specifically overridden such as through the FBW flight control system 51.

The mechanical-hydraulic control system 48 includes the shuttle valve system 46 having a shuttle valve housing 84 mounted to and for movement with the oil transfer/position feedback tube 72. A shuttle valve 86 is mounted within the shuttle valve housing 84 to selectively communicate hydraulic fluid (under high pressure Ph) from the high pressure source 82 through the oil transfer/position feedback tube 72 and into the propeller dome 70 or return hydraulic fluid (low pressure Pl) from the propeller dome 70 through the oil transfer/position feedback tube 72 (FIG. 5) and back to a reservoir such as the propeller gearbox 42.

The mechanical-hydraulic control system 48 communicates an input from a servo 88 to the shuttle valve 86 through an input link 90. The input link 90 is pivotally mounted to the shuttle valve 86 at a shuttle pivot 92 and pivots about a tube pivot 94 mounted to the oil transfer/position feedback tube 72. In FIG. 3, a steady pitch case is illustrated where the input link 90 is perpendicular to the oil transfer/position feedback tube 72. It should be understood that the particular perpendicular relationship illustrated is exemplary and for illustrative purposes only; and that any other relationship may likewise represent the steady pitch case.

Alternatively, the shuttle valve system 46 may be configured as spring loaded to center to provide 'beep' control to the propeller via a mechanical or electrical linkage to the shuttle valve such as a 2-way solenoid operated by beeper buttons on the pilot's controls.

In response to the controller 50, the servo 88 drives the input link 90 through a pushrod 96 pivotally mounted to the input link 90 at a servo pivot 98. The tube pivot 94 may include an exaggerated sloppy link to provide some deadband and eliminate hunting about a setpoint. It should be understood that there are various methods to obtain some deadband and eliminate hunting such as, preferably, spool valve machining as is typical of hydraulic servo systems.

To increase the pitch of the blades 64, the servo 88 pulls the pushrod 96 which pulls the shuttle valve 86 outward relative the shuttle valve housing 84 (to the right in FIG. 4). The input link 90 is thereby pivoted off of vertical and becomes non-perpendicular relative to the oil transfer/position feedback tube 72. Hydraulic fluid (under high pressure Ph) from the high pressure source 82 is ported through the shuttle valve system 46, through the oil transfer/position feedback tube 72 and into the propeller dome 70. The hydraulic fluid fills the propeller dome 70 and translates the propeller pitch change piston 68 (to the left in the Figure) and oil transfer/position feedback tube 72 until the oil transfer/position feedback tube 72 catches up to the position of the shuttle valve 86. The input link 90 is then again perpendicular to the oil transfer/position feedback tube 72 and the flow of hydraulic fluid is blocked (FIG. 3) and the blades 64 are maintained at the increased pitch position. That is, the input link 90 is again perpendicular to the oil transfer/position feedback tube 72 as illustrated in FIG. 3 with, however, the propeller pitch change piston 68 having shifted to the left in the Figure.

To decrease the pitch of the blades 64, the servo 88 pushes the pushrod 96 which pushes the shuttle valve 86 inward relative the shuttle valve housing 84. The input link 90 is thereby pivoted off of vertical and becomes non-perpendicular to the oil transfer/position feedback tube 72. Hydraulic fluid is drained from the propeller dome 70, through the oil transfer/position feedback tube 72 and out the shuttle valve system 46 to an oil reservoir such as into the gearbox. 42. The hydraulic fluid is drained from the propeller dome 70 and translates the propeller pitch change piston 68 and oil transfer/position feedback tube 72 until the oil transfer/position feedback tube 72 catches up to the position of the shuttle valve 86. The input link 90 is then again perpendicular to the oil transfer/position feedback tube 72, the flow of hydraulic fluid is blocked, and the blades 64 are at the decreases pitch position.

The forces on the oil transfer/position feedback tube 72 are typically near zero. The hydraulic fluid in the propeller hub 70 does the work of setting the pitch of the blades. The oil transfer/position feedback tube 72 need only support the axial translational load generated by the electromechanical servos 88 with an additional safety margin.

The shuttle valve system 46 further includes a bias member 100 such as a spring which biases the shuttle valve 86 toward a flat pitch position to assure that the propeller blades 64 fail-safe to flat pitch should a failure or damage occur. The bias member 100 assures that the shuttle valve 86 is biased to dump the hydraulic fluid from the propeller hub 70 under such condition.

Additionally, the shuttle valve system 46 may also include a dump valve 102 to likewise assure hydraulic fluid is dumped from the propeller hub 70 to drive the blades 64 to flat pitch. The dump valve 102 is preferably controlled by an actuator 104 such as a cable or solenoid. The actuator is controlled by the controller 50 or other system should it become necessary to immediately drive the blades 64 to flat pitch.

Figure 6:
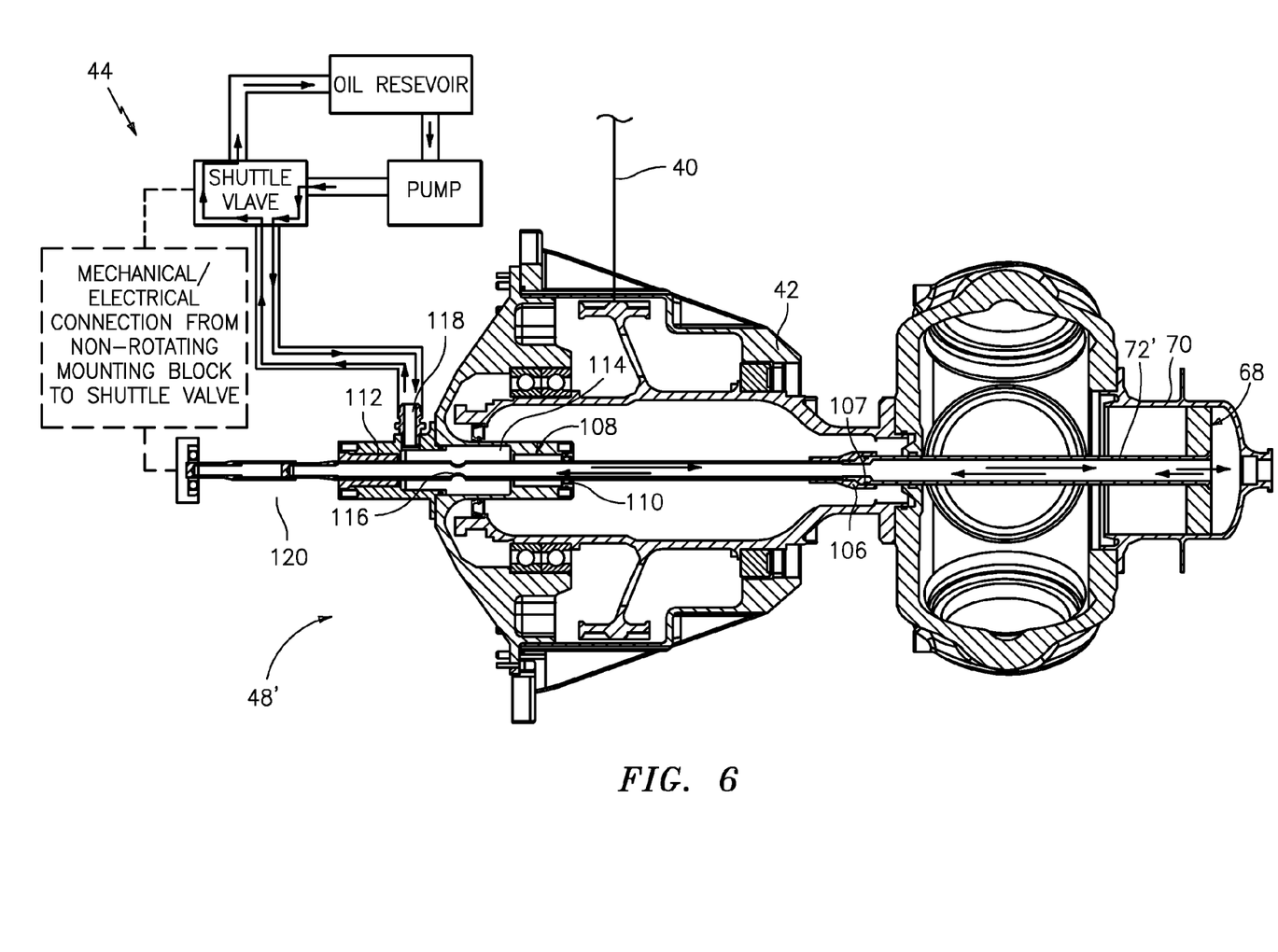
FIG. 6 is a schematic view of a translational thrust system with another mechanical-hydraulic control system for pitch control of a propeller system.

Referring to FIG. 6, another preferred embodiment of the mechanical-hydraulic control system 48' is illustrated. The oil transfer/position feedback tube 72' in this embodiment both rotates and translates with the propeller pitch change piston 68. The oil transfer/position feedback tube 72' may includes a threaded interface 106, with an O-ring seal 107 to facilitate removal and maintenance of the propeller system 32 relative the propeller gearbox 42.

The oil transfer/position feedback tube 72' is mounted through an oil chamber housing 108 which is preferably manufactured as a portion of the propeller gearbox 42. The oil chamber housing 108 includes a seal 110, 112 which permits rotation and translation of the oil transfer/position feedback tube 72 to define an oil chamber therein 114. The oil chamber 114 communicates with the oil transfer/position feedback tube 72' through at least one oil transfer/position feedback tube port 116. The oil chamber 114 is of a length that the oil transfer/position feedback tube port 116 remains within the oil chamber 114 as the oil transfer/position feedback tube 72' translates. The oil chamber housing 108 is fixed so plumbing to and from the hydraulic system 44 is relatively uncomplicated including a fixed fitting 118.

Figure 7:
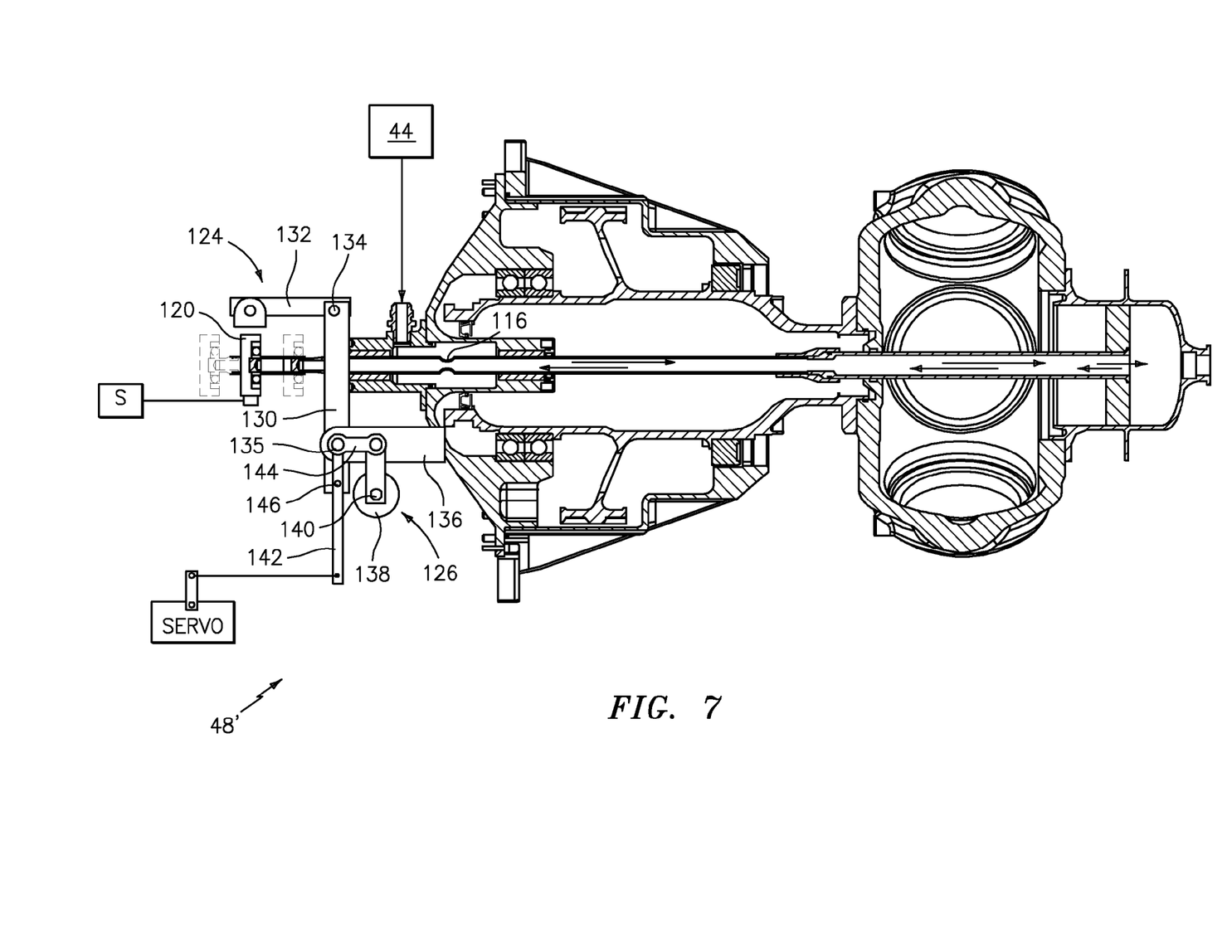
FIG. 7 is a schematic view of the mechanical-hydraulic control system of FIG. 6, the mechanical-hydraulic control system illustrated in a steady mid-pitch case state.

The oil transfer/position feedback tube 72' extends through the propeller gearbox 42 and is capped or otherwise closed. A bearing plate 120 provides the interface between the oil transfer/position feedback tube 72 and the mechanical-hydraulic control system 48' (FIG. 7). It should be understood that there may be additional support bearings to prevent the oil transfer/position feedback tube 72' from being excited on a natural bending frequency. There may also be such supports for the shuttle valve system and other components to prevent similar vibrations.

The hydraulic system 44 is generally as described above and includes a reservoir which may be external or internal to the propeller gearbox 42, a high pressure pump 52, and the shuttle valve system 126 which communicates through a drain line back to the reservoir.

Referring to FIG. 7, the mechanical-hydraulic control system 48' receives a translation position of the oil transfer/position feedback tube 72'. The mechanical-hydraulic control system 48' generally includes a feedback linkage system 124 and a shuttle valve system 126. It should be understood that the illustrated linkage system layout is one possible configuration and that within the art of mechanical-hydraulic controls there are many permutations of this geometry such that any configuration of this geometry may be utilized herewith. For example, the oil transfer/position feedback tube 72' may alternatively or additionally be directly instrumented through a sensor suite S to identify and control the position of the shuttle valve system 126 directly such that feedback loop closure is performed with the controller 50.

The feedback linkage system 124 generally includes a feedback link 130, and a feedback-bearing link 132 which mounts to the bearing plate 120. The feedback link 130 is pivotally mounted to the feedback-bearing link 132 at a pivot 134 and to a fixed support structure 136 which extends from the propeller gearbox 42 at a pivot 135.

The shuttle valve system 126 in this embodiment is remote from the oil transfer/position feedback tube 72' and is preferably includes a rotary shuttle valve 138 typical of a servo, however, other hydraulic controls will likewise be usable with the present invention.

The shuttle valve system 126 generally includes the rotary shuttle valve 138, a shuttle valve control arm 140 pivotally attached to a servo input arm 142 through a shuttle-input link 144. The servo input arm 142 is pivotally mounted to the feedback link 130 at a input-feedback pivot 146 such that the servo input arm 142 pivots relative the feedback link 130 to change the position of the shuttle valve control arm 140 through the shuttle-input link 144.

To hold a given propeller blade position, the mechanical-hydraulic control system 122 is positioned such that the rotary shuttle valve 138 blocks off the high pressure hydraulic fluid, the drain line, and the output to the fitting 118. This maintains the fluid volume inside the propeller dome 70 constant, and the propeller blade holds pitch. To increase the propeller blade 64 pitch, the servo input arm 142 changes the state of the rotary shuttle valve 138 to selectively communicate hydraulic fluid (under high pressure Ph) from the high pressure source into the oil chamber 114, ported through the oil transfer/position feedback tube port 116, the oil transfer/position feedback tube 72' and into the propeller dome 70 to change the propeller blade pitch as described above through translation of the propeller pitch change piston 68. Conversely, hydraulic fluid is ported out of the propeller dome 70 to decrease propeller blade pitch.

FIG. 7 illustrates the mechanical-hydraulic control system 148 in a position which holds the propeller blades in a steady mid-pitch position. The bearing plate 120 on the end of the oil transfer/position feedback tube 72' is in a middle position. The servo input arm 142 is parallel to the feedback link 130 and both are generally perpendicular to the oil transfer/position feedback tube 72'. It should be understood that these relationships are exemplary and for illustrative purposes only; and that any other relationship may likewise represent the steady mid-pitch position as well as any other position.

Figure 8:
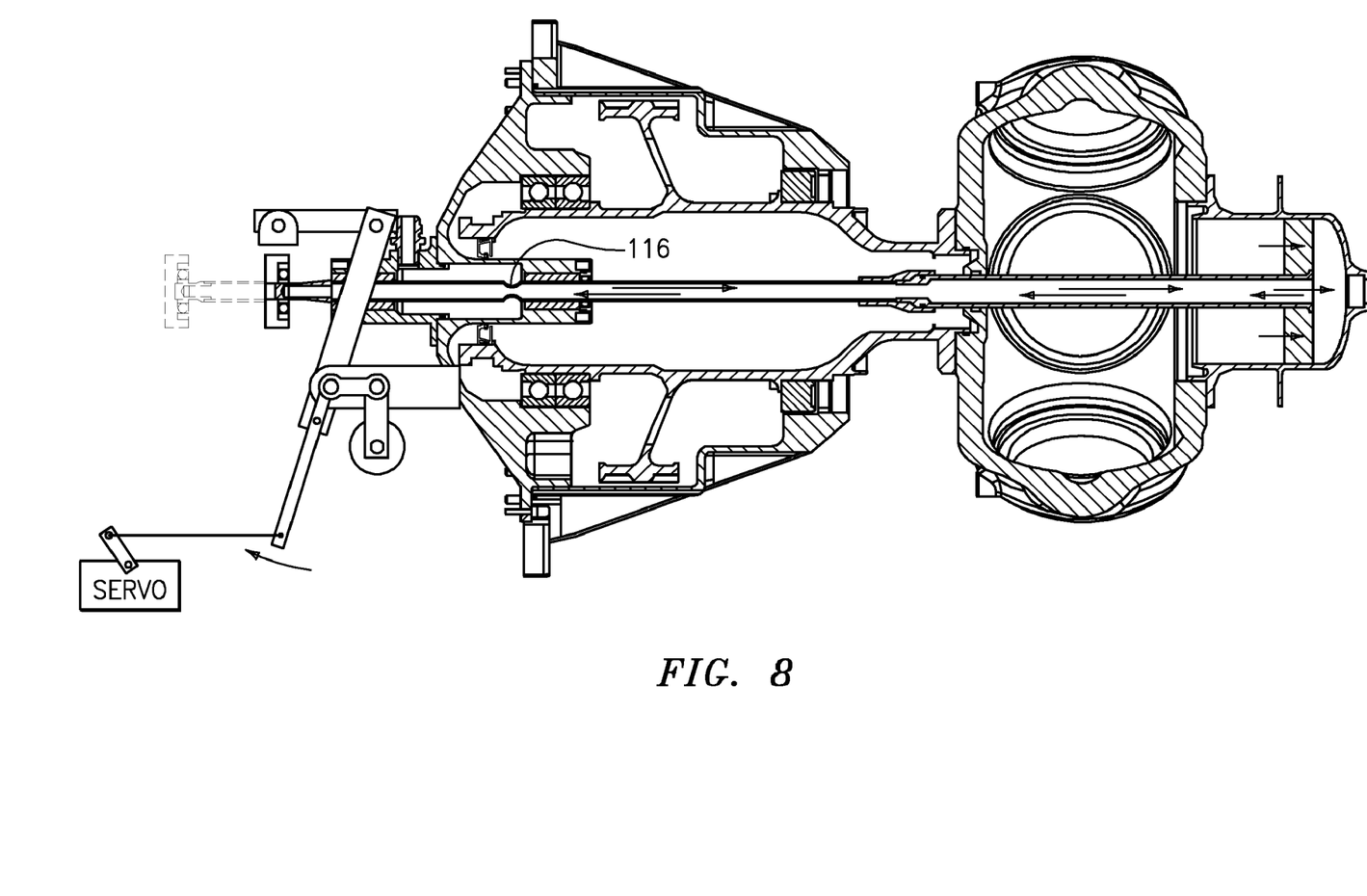
FIG. 8 is a schematic view of the mechanical-hydraulic control system of FIG. 6, the mechanical-hydraulic control system illustrated in a steady flat-pitch case state.
Figure 9:
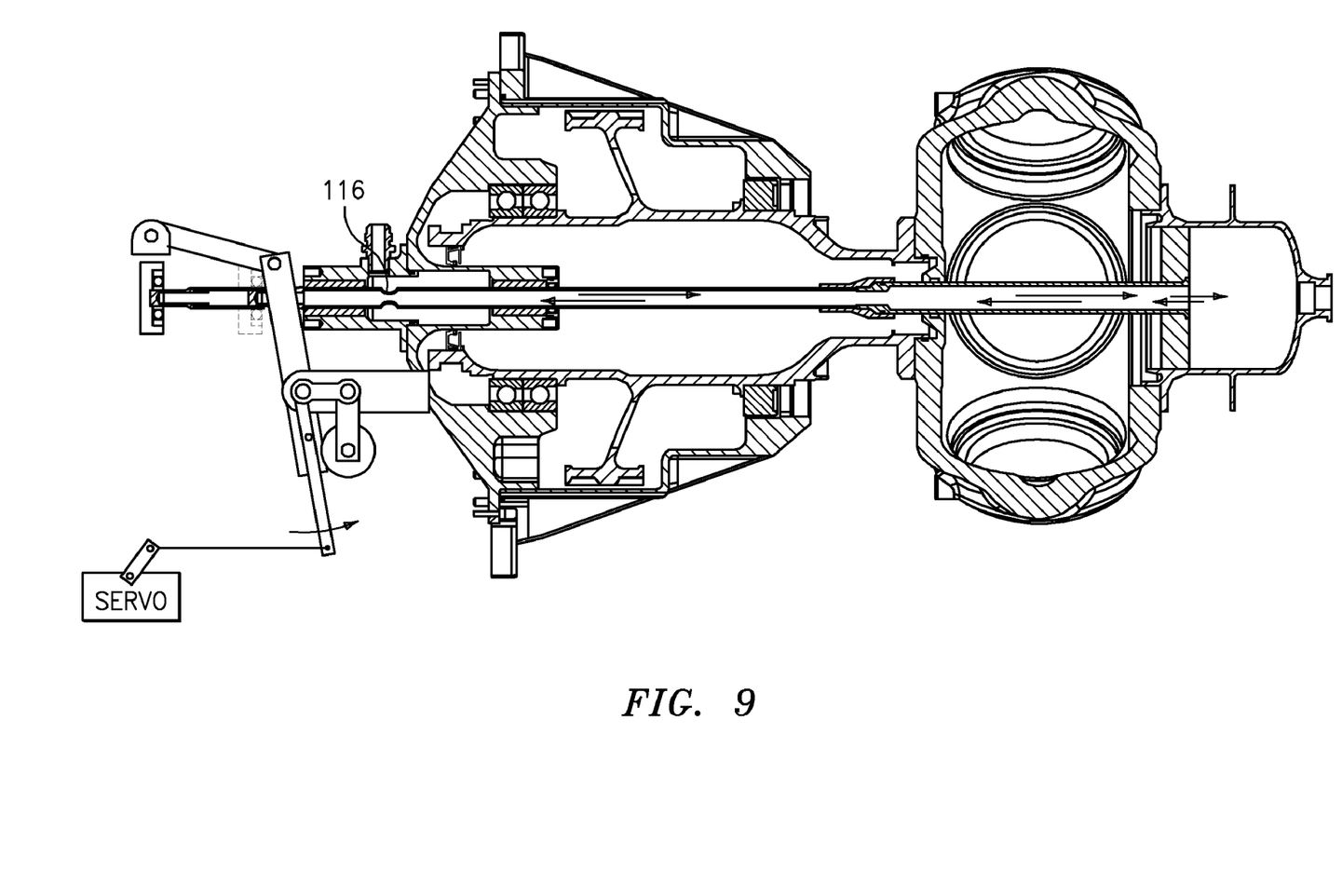
FIG. 9 is a schematic view of the mechanical-hydraulic control system of FIG. 6, the mechanical-hydraulic control system illustrated in a steady high-pitch case state.

Referring to FIG. 8, the mechanical-hydraulic control system 48' is in a position which maintains the propeller blades 64 in a steady flat pitch position. The bearing plate 120 is displaced toward the propeller gearbox 42. Because of translation of the oil transfer/position feedback tube 72' the servo input arm 142 and feedback link 130 are non-perpendicular to the oil transfer/position feedback tube 72'. The servo input arm 142 is, however, parallel to the feedback link 130 which positions the rotary shuttle valve 138 in the closed position— the shuttle valve control arm 140 is perpendicular to the oil transfer/position feedback tube 72'. The propeller blades will maintain steady low pitch in this condition. FIG. 9 is the same in description as FIG. 8, except with the mechanical-hydraulic control system 48' in a position to hold the propeller blades in a high pitch position as the bearing plate 120 has been displaced away from the propeller gearbox 42.

Figure 10:
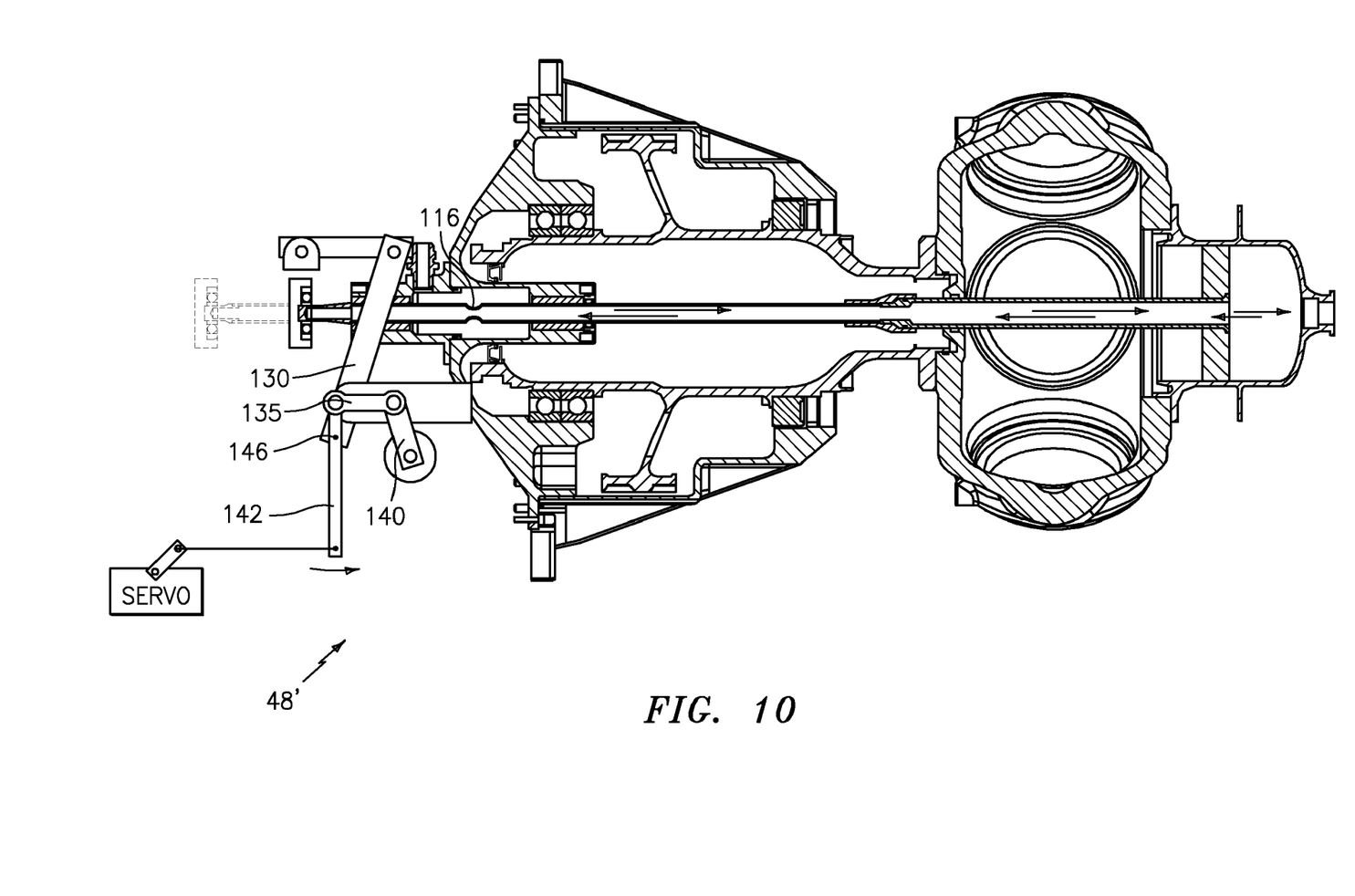
FIG. 10 is a schematic view of the mechanical-hydraulic control system of FIG. 6, the mechanical-hydraulic control system illustrated n increasing pitch case with the propeller blades increasing in pitch toward a steady high-pitch state.

FIG. 10 illustrates the mechanical-hydraulic control system 48' in an actuation position in which the mechanical-hydraulic control system 48 is shown during increase of the pitch of the propeller blades 64. The propeller blades are in flat pitch but the servo input arm 142 has been displaced by an input by the servo or other actuator system.

The servo input arm 142 is thereby pivoted to a non-parallel position relative the feedback link 130 about the input-feedback pivot 146. The servo input arm 142 displaces the shuttle valve control arm 140 through the shuttle-input link 144 to rotationally actuate the rotary shuttle valve 138. In this representative case, the rotary shuttle valve 138 is rotated such that the that high pressure hydraulic fluid is ported to the in/out fitting, into the oil chamber, into the oil transfer/position feedback tube 72', and into the propeller hub 70 thereby increasing the propeller blade pitch as described above through translation of the propeller pitch change piston 68 when the oil transfer/position feedback tube 72' reaches the commanded position, the servo input arm 142 will again be parallel to the feedback link 130 (FIG. 8).

To decrease pitch, the servo input arm 142 is pivoted to an opposite non-parallel position opposite FIG. 10 relative the feedback link 130 about the input-feedback pivot 146 and the rotary shuttle valve 138 is rotated in an opposite direction such that the hydraulic fluid is ported out of the propeller dome 70.

The translational thrust system 30 provides the integration of thrust control through the variable pitch propeller with the Fly-By-Wire (FBW) system to position propeller blades 64 with a high degree of confidence of the pitch angle. This allows the propeller pitch to be set independently of the current RPM of the dynamic system, therefore causing the translational thrust system 30 to produce the required thrust for the situation. Additionally, the pitch angle, the thrust, and the torque required by the propeller blades 64 are largely steady, or increasing/decreasing in a slow and monotonic manner. This steadiness of torque makes stable control of RPM possible through ECU actions.

Figure 11:
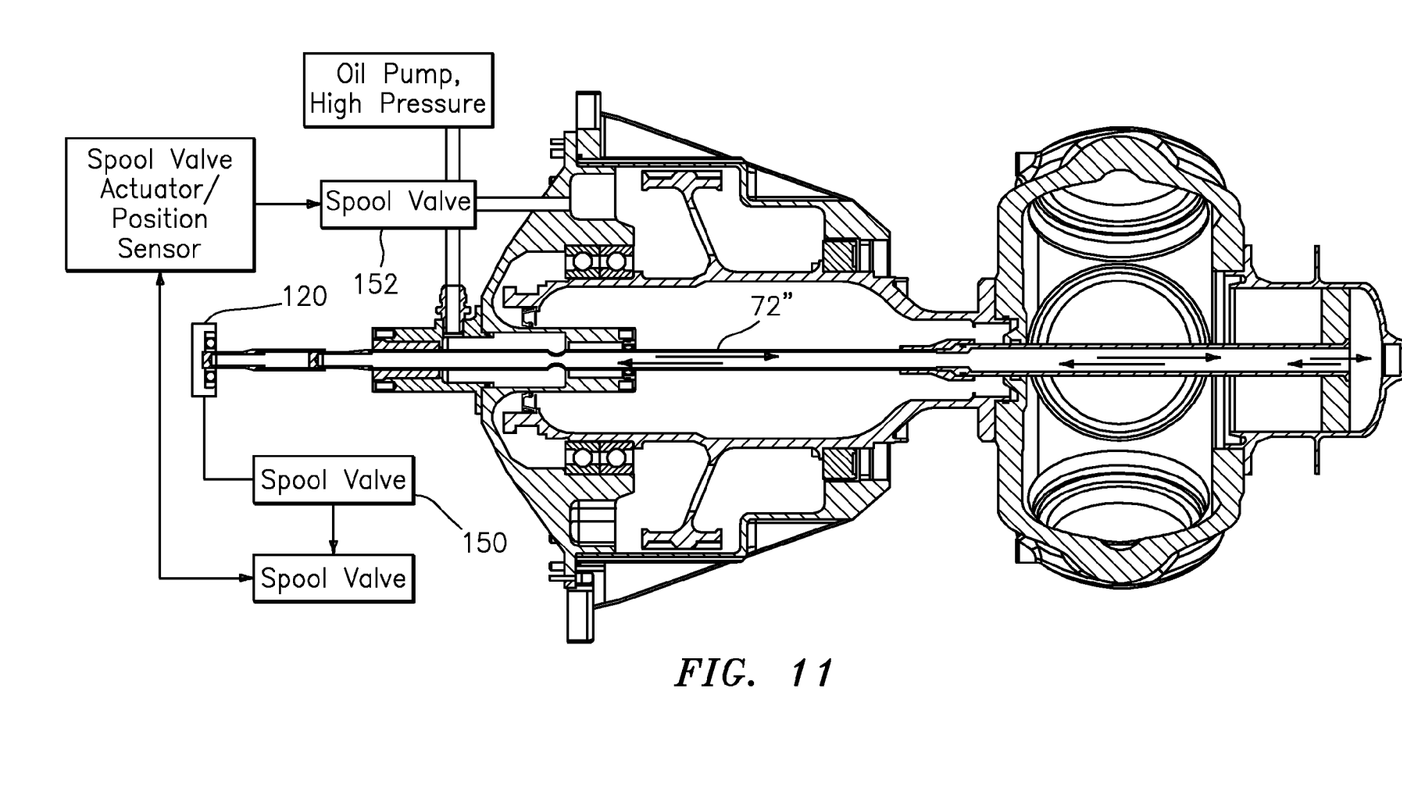
FIG. 11 is a schematic view of a translational thrust system with another mechanical-hydraulic control system for pitch control of a propeller system, the mechanical-hydraulic control system being implemented without mechanical feedback.

Referring to FIG. 11, another embodiment of the mechanical-hydraulic control system 48" is illustrated. The oil transfer/position feedback tube 72" position is sensed directly by a position sensor system 150 and the sensed position of the oil transfer/position feedback tube 72" is then converted directly to a propeller pitch using the known geometry for the system through, for example, the Fly-By-Wire (FBW) system. The position of the valve system 152 is preferably independently measured and controlled through an Electro Mechanical Actuator, which both measures position and provides loop closure of that position, or by an independent position measurement and a torque coil EMA in communication with the valve system 152. Control laws in the FBW system form an error signal in response to desired and measured propeller pitch, and a control signal modulates the valve system 152 to achieve and maintain a desired propeller pitch position.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A translational thrust system for a rotary-wing aircraft comprising:
   a propeller system which includes a propeller hub and a plurality of propeller blades which rotate about a propeller rotational axis transverse to a main rotor system axis of rotation;
   a propeller pitch change piston within said propeller hub, said propeller pitch change piston mechanically linked to said plurality of propeller blades; and
   a mechanical-hydraulic control system in communication with said propeller system, said mechanical-hydraulic control system includes an oil transfer/position feedback tube mounted to said propeller pitch change piston, said propeller pitch change piston and said oil transfer/position feedback tube mounted for translational movement along said propeller rotational axis relative to said propeller hub to change a pitch of said plurality of propeller blades, said propeller pitch change piston mounted to said oil transfer/position feedback tube for rotation relative thereto.

2. The system as recited in claim 1, further comprising a Fly-By-Wire (FBW) flight control system to directly control a valve system to translate said oil transfer/position feedback tube in response to a position sensor system in communication with said oil transfer/position feedback tube.

3. The system as recited in claim 1, wherein said propeller pitch change piston is mounted for translational movement within said propeller hub.

4. The system as recited in claim 1, wherein said propeller pitch change piston is mounted to said oil transfer/position feedback tube for rotation therewith.

5. The system as recited in claim 1, wherein said propeller rotational axis is transverse to a main rotor system axis of rotation, said main rotor system includes a coaxial contra-rotating rotor system.

6. The system as recited in claim 1, wherein said mechanical-hydraulic control system includes a pitch stop which fail-safes said propeller system to a flat pitch.

7. The system as recited in claim 6, wherein said pitch stop is selectively overridden in response to a pilot control.

8. The system as recited in claim 1, wherein said mechanical-hydraulic control system includes a propeller dump valve which dumps a hydraulic pressure to fail-safe said propeller system to a flat pitch.

9. The system as recited in claim 8, wherein said propeller dump valve communicates, with said propeller hub to dump a hydraulic fluid therefrom.

10. The system as recited in claim 1, wherein said mechanical-hydraulic control system communicates with said propeller system to provide proportional control of said pitch of said plurality of propeller blades.

11. The system as recited in claim 1, wherein said mechanical-hydraulic control system includes a shuttle valve system movable relative said oil transfer/position feedback tube, said shuttle valve system operable to selectively communicate a hydraulic fluid from a high pressure source to said oil transfer/position feedback tube and from said oil transfer/position feedback tube to a reservoir.

12. A translational thrust system for a rotary-wing aircraft comprising:
   a propeller system which includes a propeller hub and a plurality of propeller blades which rotate about a propeller rotational axis transverse to a main rotor system axis of rotation;

a propeller pitch change piston within said propeller hub, said propeller pitch change piston mechanically linked to said plurality of propeller blades;

a mechanical-hydraulic control system in communication with said propeller system, said mechanical-hydraulic control system includes an oil transfer/position feedback tube mounted to said propeller pitch change piston, said propeller pitch change piston and said oil transfer/position feedback tube mounted for translational movement along said propeller rotational axis relative to said propeller hub to change a pitch of said plurality of propeller blades, said mechanical-hydraulic control system includes a shuttle valve system movable relative said oil transfer/position feedback tube, said shuttle valve system comprising:

a shuttle valve housing mounted for translational movement with said oil transfer/position feedback tube; and a shuttle valve mounted within the shuttle valve housing to selectively communicate a hydraulic fluid from a high pressure source to said oil transfer/position feedback tube and from said oil transfer/position feedback tube to a reservoir.

13. A drive system for a rotary-wing aircraft comprising:
a main rotor system which rotates about a main rotor system axis of rotation;
a main gearbox to drive said main rotor system; and
a translational thrust system driven by said main gearbox, said translational thrust system comprising:

a propeller system which includes a propeller hub and a plurality of propeller blades which rotate about a propeller rotational axis transverse to said main rotor system axis of rotation;

a propeller pitch change piston within said propeller hub, said propeller pitch change piston mechanically linked to said plurality of propeller blades; and a mechanical-hydraulic control system in communication with said propeller system, said mechanical-hydraulic control system includes an oil transfer/position feedback tube mounted to said propeller pitch change piston, said propeller pitch change piston and said oil transfer/position feedback tube mounted for translational movement along said propeller rotational axis relative to said propeller hub to change a pitch of said plurality of propeller blades, said propeller pitch change piston mounted to said oil transfer/position feedback tube for rotation relative thereto.

14. The drive system as recited in claim 13, wherein said main rotor system includes a coaxial contra-rotating rotor system.

15. The drive system as recited in claim 13, wherein said translational thrust system includes a pusher propeller.

16. The drive system as recited in claim 13, further comprising a propeller pitch controller in communication with a Fly-By-Wire (FBW) flight control system, said propeller pitch controller operable to adjust a pitch of said plurality of propeller blades.

17. The drive system as recited in claim 16, wherein said propeller pitch controller communicates with a sensor system which determines a translated position of said oil transfer/position feedback tube.

18. A method of controlling a translational thrust system of a rotary-wing aircraft comprising:
(A) translating an oil transfer/position feedback tube and a propeller pitch change piston relative to a propeller hub along a propeller rotational axis transverse to a main rotor system axis of rotation to change a pitch of a propeller system, the oil transfer/position feedback tube mounted to the propeller pitch change piston, the propeller pitch change piston mounted to the oil transfer/position feedback tube for rotation relative thereto.

19. A method as recited in claim 18, further comprising the step of:
(B) changing a pitch of the plurality of propeller blades independent of an RPM of the propeller system.

20. A method as recited in claim 18, wherein said step (A) further comprises:
(B) controlling a valve system to translate the oil transfer/position feedback tube in response to a position sensor system which determines a translated position of said oil transfer/position feedback tube.

* * * * *